(12) United States Patent
Reisch et al.

(10) Patent No.: US 9,470,329 B2
(45) Date of Patent: Oct. 18, 2016

(54) DEVICE FOR CONTROLLING A FLOW OF COOLANT AND/OR LUBRICATING OIL

(75) Inventors: Matthias Reisch, Ravensburg (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 289 days.

(21) Appl. No.: 14/352,100

(22) PCT Filed: Sep. 13, 2012

(86) PCT No.: PCT/EP2012/067914
§ 371 (c)(1),
(2), (4) Date: Apr. 16, 2014

(87) PCT Pub. No.: WO2013/056905
PCT Pub. Date: Apr. 25, 2013

(65) Prior Publication Data
US 2014/0264112 A1  Sep. 18, 2014

(30) Foreign Application Priority Data

Oct. 17, 2011 (DE) .......................... 10 2011 084 584

(51) Int. Cl.
| | |
|---|---|
| *F16K 31/02* | (2006.01) |
| *F16D 25/12* | (2006.01) |
| *F16D 13/72* | (2006.01) |
| *F16D 25/0638* | (2006.01) |
| *F16D 25/10* | (2006.01) |

(52) U.S. Cl.
CPC .............. *F16K 31/02* (2013.01); *F16D 25/12* (2013.01); *F16D 25/123* (2013.01); *F16D 13/72* (2013.01); *F16D 25/0638* (2013.01); *F16D 25/10* (2013.01)

(58) Field of Classification Search
CPC ................................ F16K 31/02; F16K 31/12
USPC ....................................... 184/6.12; 251/129.11
See application file for complete search history.

(56) References Cited

U.S. PATENT DOCUMENTS

| | | | |
|---|---|---|---|
| 6,408,621 B1 * | 6/2002 | Moser | ................. F16D 35/024 60/337 |
| 7,112,156 B2 | 9/2006 | Maguire | |
| 8,028,596 B2 | 10/2011 | Reisch et al. | |
| 8,601,893 B2 | 12/2013 | Reisch et al. | |
| 2007/0145315 A1 * | 6/2007 | Uemura | ............. F04B 27/1804 251/84 |

(Continued)

FOREIGN PATENT DOCUMENTS

| | | |
|---|---|---|
| DE | 10 2005 007 685 A1 | 8/2006 |
| DE | 10 2008 000 644 A1 | 9/2009 |
| EP | 1 304 494 A1 | 4/2003 |

OTHER PUBLICATIONS

German Search Report, May 11, 2012.
(Continued)

*Primary Examiner* — William E Dondero
*Assistant Examiner* — Mark K Buse
(74) *Attorney, Agent, or Firm* — Dority & Manning, P.A.

(57) ABSTRACT

A device is provided for controlling at least one cooling oil flow and/or lubricating oil flow by means of at least one valve (17) for at least one cooling point and/or lubrication point (3, 4) connected to a shaft (1). The valve (17) is connected in an electrically controllable and torque-proof manner to a cooling point and/or lubrication point (3, 4). The electrical energy is able to be supplied for actuating the valve (17) without contact.

18 Claims, 3 Drawing Sheets

(56) References Cited

U.S. PATENT DOCUMENTS

| | | | | |
|---|---|---|---|---|
| 2007/0240690 A1* | 10/2007 | Nanba | ................... | F16K 31/041 |
| | | | | 123/568.18 |
| 2009/0084650 A1* | 4/2009 | Hennessy | ............. | F16D 35/024 |
| | | | | 192/58.61 |
| 2010/0089717 A1 | 4/2010 | Pickelman et al. | | |
| 2011/0229323 A1* | 9/2011 | Roby | ..................... | F01P 7/042 |
| | | | | 416/169 R |
| 2012/0248355 A1* | 10/2012 | Harada | ................... | F16K 31/04 |
| | | | | 251/129.11 |
| 2014/0230591 A1* | 8/2014 | Reisch | ............... | H02K 11/0094 |
| | | | | 74/335 |

OTHER PUBLICATIONS

PCT Search Report, Nov. 7, 2012.
PCT Preliminary Examination Report, Nov. 7, 2012.

* cited by examiner

Fig. 3

DEVICE FOR CONTROLLING A FLOW OF COOLANT AND/OR LUBRICATING OIL

FIELD OF THE INVENTION

The invention relates to a device and use for controlling a cooling oil flow and/or lubricating oil flow by means of a valve for a cooling point and/or lubrication point connected to a shaft.

BACKGROUND

Multi-disk shifting elements are used in motor vehicle transmissions, in particular automatic transmissions, as clutches and brakes for the shifting of gears. The actuation of the shifting elements, i.e. closing and opening, generally takes place hydraulically, whereas a separate hydraulic circuit with a transmission oil pump is provided. Upon closing the multi-disk shifting elements, due to friction, heat arises when pressing together the multi-disks—therefore, the shifting elements must be cooled in order to prevent an overheating and possible damage to the multi-disks or multi-disk coverings. For this purpose, supplying the multi-disk pack of the shifting elements with cooling oil from a lubricating oil circuit through suitable diverter valves is known. One problem with oil cooling of the multi-disks is that—in particular if there is an open clutch—the cooling oil between the multi-disks leads to an increased drag torque, which burdens the circuit of the lubricating oil pump and thus also the transmission efficiency.

Through DE 10 2005 007 685 A1, a cooling oil supply for a wet-running shifting element with a multi-disk pack is known. Thereby, depending on the position of the piston of the shifting element, the cooling oil is controlled mechanically, e.g. through a sliding plate affixed to the piston. Thus, in a closed state, the shifting element is constantly coated with cooling oil, which is slung to the outside against the shifting element by centrifugal force. In a further variant, a cooling oil flow is supplied to the multi-disk pack by actuating a valve, based on demand. Thereby, the cooling oil supply to the shifting element is carried out from the outside through an oil channel, whereas the valve is shifted on or off, based on demand.

SUMMARY OF THE INVENTION

It is a task of the invention to control, based on demand, the cooling oil and/or lubricating oil flow for at least one cooling point and/or lubrication point, in particular when used in transmissions. Additional objects and advantages of the invention will be set forth in part in the following description, or may be obvious from the description, or may be learned through practice of the invention.

The tasks of the invention are solved by the characteristics of the independent patent claims. Advantageous arrangements arise from the dependent claims.

In accordance with the invention, with a device for controlling a cooling oil flow and/or lubricating oil flow, an electrically controllable valve is provided, which is connected in a torque-proof manner with the cooling point and/or lubrication point, whereas the electrical energy for the actuation of the valve is able to be supplied without contact. This achieves need-based cooling and/or lubrication. The cooling and/or lubrication points may—when being used in a transmission—be multi-disk shifting elements, in particular clutches, but also bearings or gear wheels. With multi-disk clutches, drag torques arising from an oil supply that is not needed are reduced. The contact-free transmission of power preferably takes place on an inductive basis. This avoids plug connections and friction losses.

According to a preferred embodiment, the valve is arranged in a functional mounting at least in areas, which is connected to the shaft in a torque-proof manner. The cooling points and/or lubrication points, e.g., multi-disk clutches in a transmission, are thus connected through the functional mounting in a torque-proof manner to the shaft, preferably a gear shaft.

According to a further preferred embodiment, the valve, hereinafter also referred to as a cooling oil valve, is connected on the primary side, i.e. on its intake side, through first oil channels in the functional mounting and/or in the shaft, and through a rotary oil exchanger to a stationary source of lubricating oil; the oil supply may also occur directly from the rotary oil exchanger into the oil channels of the functional mounting. Since, preferably, several cooling oil valves are arranged around the circumference of the functional mounting and several shifting elements on the functional mounting, it is advantageous that only one rotary oil exchanger, i.e. only one delivery point, sealed by sealing elements, is provided between the housing and the rotating shaft. This avoids friction and leakage losses. In this case, the functional mounting, which features additional functions, thus a multi-functional mounting, functions as a valve and oil distribution housing, in which the lubricating oil supplied by the rotary oil exchanger is distributed to several cooling oil valves in the functional mounting.

According to a further preferred embodiment, two oil channels, which are arranged in the functional mounting and feature outlet openings in the area of the shifting element(s), are allocated to the cooling oil valve on the secondary side, i.e. on its discharge side. If the valve is open, the oil exits the outlet openings, and is led or centrifuged to the multi-disk pack(s) or other cooling points and/or lubrication points through suitable means (for example, deflection elements) and by centrifugal force. Through this, effective cooling is achieved.

According to a further preferred embodiment, a manifold directed radially inward is arranged in the area of the second oil channel. This manifold, which has the effect of a siphon, prevents the valve housing from running dry and no longer filling with oil. Thus, in accordance with the siphon principle, after exiting the valve housing, the oil is initially guided to a smaller diameter—against the centrifugal force—and only then led to the multi-disk shifting element. This ensures that the space in which the moving parts of the valve are found remain filled with oil, and thereby enable compensation for the centrifugal force. To compensate for the centrifugal force, it is necessary that the moving valve parts experience a sufficient buoyant force through the lubricating oil.

According to a further preferred embodiment, the valve is designed as a shift valve or a control valve. Thereby, it is on the one hand possible to, with the same cooling oil flow, either switch on or off the valve, or adjust the cooling oil flow with regard to its quantity. Thus, if there is severe overheating, more cooling oil may be supplied. At lower heat, a lower cooling oil flow is sufficient.

According to a further preferred embodiment, a servomotor or a drive is allocated to the valve part of an actuator, i.e. the valve or the valve closure element, which brings about the opening or closing of the valve. The actuator comprises an electric motor, which transfers its rotational movement to a valve spindle, which, through a screw thread, converts the rotational movement into a translational movement of the valve closure element. Thereby, intermediate positions and a relatively high sealing pressure of the valve closure element can be achieved.

According to a further preferred embodiment, the valve is designed as a magnetic valve. This eliminates a rotational movement in favor of a pure translational movement of a valve tappet. Through the magnetic valve, a higher dynamic in the valve characteristics is achieved.

According to a further preferred embodiment, an electronic control device, which is hereinafter also referred to as an electronics module, is able to be fastened on the functional mounting; it is adjusted to the functional mounting and forms one functional unit with it. The contact-free transmission of electrical energy and/or signals may be effected through a primary coil arranged on a fixed housing and a secondary coil (i.e., co-rotating) arranged in the electronics module. Thus, the electronics module forms, with the fixed-location part of the power transmission device, a first interface, and, with the electrically controllable actuators, a second interface.

According to a further preferred embodiment, at least one actuator is at least partially able to be incorporated in the electronic control device. This may concern parts of the electric drive of the actuator, such as the stator of an electric motor or the magnetic coil of an electromagnet. Such parts are enclosed in a housing of the electronic control device.

According to a further preferred embodiment, several valves in the functional mounting and in the electronics module are arranged in a manner distributed around the circumference. Thereby, in addition to the aforementioned cooling oil valves for cooling shifting elements, shut-off valves of a hydraulic circuit for shifting the shifting elements can also be arranged. The hydraulic circuit, which features a higher pressure level, can be connected to a source of pressure oil through its own rotary oil supply. With such a shut-off valve, if the clutch in the locked cylinder is closed, the closing pressure may be maintained without actuating the pump. Such a shut-off valve is the subject matter of a patent application simultaneously submitted by the applicant with the U.S. Ser. No. 14/352,104, which is hereby fully incorporated in the disclosure content of this application.

According to a further preferred embodiment, moving parts of the actuator, for example, the armature shaft and the valve spindle, which can be found in the rotating functional mounting, are arranged in floating form in cooling or lubricating oil. This ensures that the moving parts experience a buoyant force, which at least partially offsets the centrifugal force. Thus, even at higher rotational speeds for exercising their function, the moving parts can be moved without major resistance.

According to a further preferred embodiment, the average density of the moving parts may, through suitable measures, approach the density of the cooling oil. For example, the armature shaft can be designed to be hollow, such that a greater volume and thus a greater buoyant force arise. On the other hand, through the use of materials of a lower density (for example, plastic or light metal), the mass of the moving parts and thus the centrifugal force can be reduced.

According to a further preferred embodiment, multiple valves can be connected to a rotary signal transmitter. This reduces friction losses in the oil supply.

According to a further preferred embodiment, a temperature sensor for detecting the temperature of the cooling oil flow and/or lubricating oil flow is provided, for example in the area of a multi-disk clutch to be cooled or a bearing. If there is deviation of the measured value, the setpoint value can be updated through the electronic control device.

According to a further preferred embodiment, the cooling oil flow and/or lubricating oil flow is directed through a fixed displacement pump; i.e., it is supplied to the rotary oil exchanger. Thereby, a pump that, independent of the need for oil, keeps the oil pressure constant (at least approximately) may be used. For example, this may take place— with motor vehicle transmissions —through a variable displacement pump powered by an internal combustion engine, with which the actual pressure is used for adjustment.

According to a further preferred embodiment, at least one cooling point and/or lubrication point is designed as a multi-disk clutch. Through the demand-controlled cooling oil flow, the drag torques with an open clutch (for example) are reduced.

According to a further aspect of the invention, the aforementioned device for controlling a cooling oil flow and/or lubricating oil flow is used for a transmission for a motor vehicle, in particular an automatic transmission. Based on its compact construction, its versatility (multi-functional mounting) and its contact-free transmission of power, the aforementioned device is particularly suitable for use in automatic transmissions for motor vehicles, because it improves the efficiency of the transmission.

BRIEF DESCRIPTION OF THE DRAWINGS

One embodiment of the invention is shown in the drawing and more specifically described below, whereas additional characteristics and/or advantages may arise from the description and/or the drawing. The following is shown.

DESCRIPTION

Figure 1:
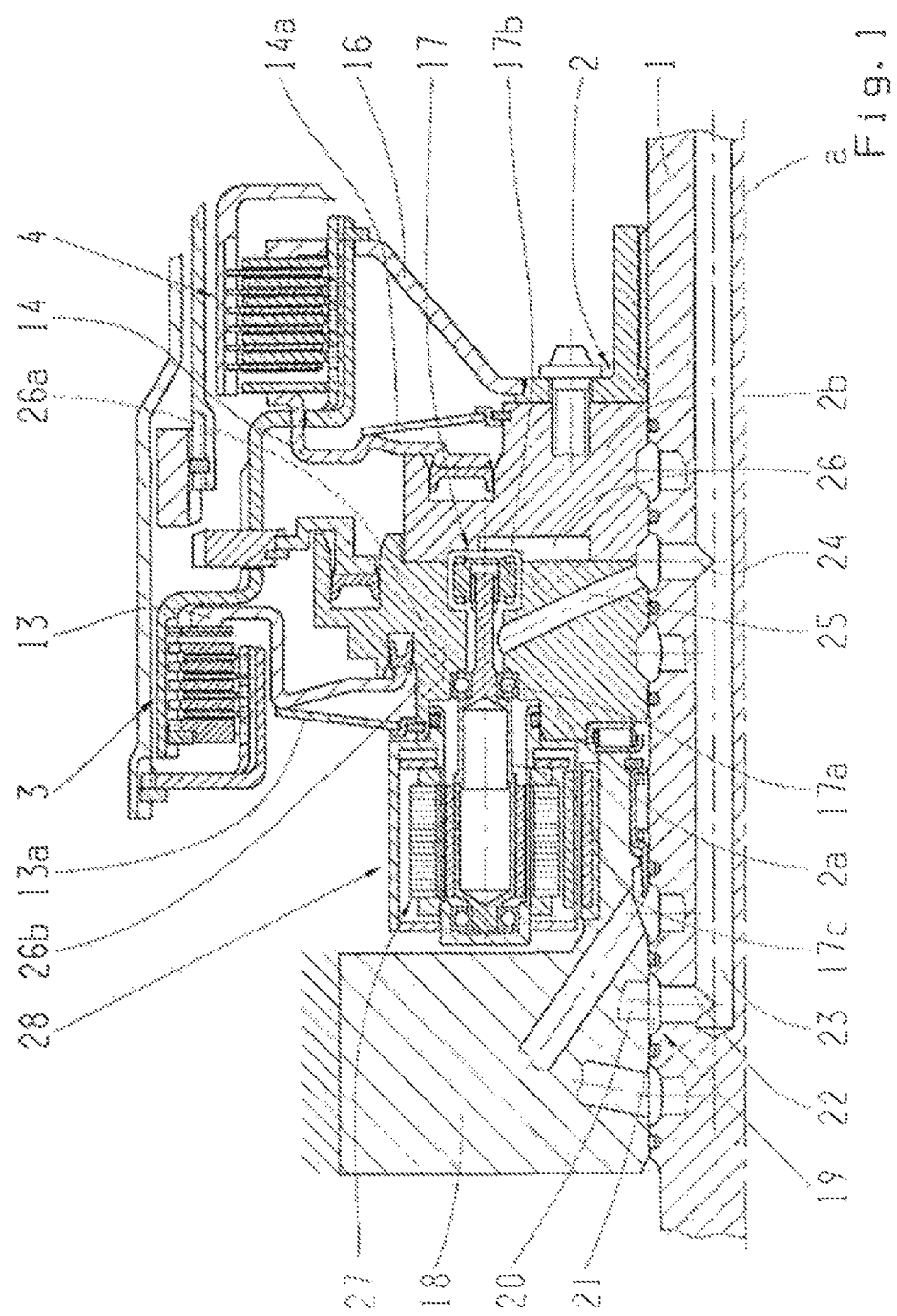
FIG. 1 an axial cut of a device in accordance with the invention with a valve for a cooling oil supply to a shifting element of a transmission, FIG. 2 a circuit diagram for a cooling oil flow and lubricating oil flow and FIG. 3 an electronics module for incorporating the actuators.

FIG. 1 shows a device for controlling a cooling oil flow for an automatic transmission of a motor vehicle. On a gear shaft 1, a so-called functional mounting 2 with a rotational axis "a" is arranged in a torque-proof manner. A first cooling point designed as a multi-disk clutch 3 and a second cooling point designed as a multi-disk clutch 4 are attached to the functional mounting 2. The first multi-disk clutch 3 is actuated through a first annular piston 13, and the second multi-disk clutch 4 is actuated through a second annular piston 14. For the retraction of the annular pistons 13, 14, disk springs 13a, 14a braced on the functional mounting 2 are provided. Through a connecting element 16 and the functional mounting 2, the drive sides of the shifting elements 3, 4 are connected to the gear shaft 1. Thus, the functional mounting 2 is also the mounting of the shifting elements 3, 4.

In accordance with the invention, a valve 17, hereinafter also referred to as a cooling oil valve 17, is arranged in the functional mounting 2, which comprises two bodies 2a, 2b connected to each other. This valve 17 controls a cooling oil flow to the multi-disk shifting element 3. A so-called rotary oil supply 19, also referred to as a rotary oil exchanger 19, is provided between a (schematically shown) transmission housing 18 and the gear shaft 1; i.e., the cooling oil is passed from a fixed-housing channel 20 into an annular groove 21 in the gear shaft 1. From there, through a radial hole 22, an axial hole 23, and an additional radial hole 24, the cooling oil passes into an oil channel 25 of the functional mounting 2, and from there into the cooling oil valve 17. On the discharge side of the cooling oil valve 17, a manifold or bag 26 directed radially inward and acting as a siphon, is arranged in the body 2a of the functional mounting 2. From the bag 26, an oil channel 26a shown with dotted lines leads to an outlet opening 26b on the outer circumference of the body 2a of the functional mounting 2. If the cooling oil valve 17 is open, the cooling oil is led initially through the bag 26 radially inward, and subsequently radially outward. This avoids the emptying of the oil chamber of the cooling oil valve 17. For reasons of centrifugal force compensation through buoyant force, this is—as described below—necessary or advantageous. From the outlet opening 26b, under the influence of the centrifugal force and along the disk spring 13a, the cooling oil arrives at the multi-disk shifting element, where a need-based cooling takes place. Only a cooling oil valve 17 is shown in the drawing. However, preferably, a second cooling oil valve offset in a circumferential direction is provided, which is allocated to the second multi-disk shifting element 4. With this, the second shifting element 4 can be cooled based on demand. In all other respects, this also emerges from the description for FIG. 2.

The cooling oil valve 17 is electrically operated, in the embodiment shown by the electric motor 27, which is arranged in an electronics module 28, designed in a ring shape. The electronics module 28, which acts as an electronic control device, is the subject matter of a separate simultaneously filed patent application of the applicant with U.S. Ser. No. 14/352,095. The subject matter of this simultaneous application is fully incorporated by reference in the disclosure content of this application. In connection with the electric motor 27, the cooling oil valve 17 forms an actuator and features a rotating spindle 17a along with a valve closure element 17b connected through it to a movement thread. The rotating spindle 17a is connected to a hollow shaft 17c, on which an armature of the electric motor 27 (not shown with a reference number) is arranged. With a rotating functional mounting 2, the rotating spindle 17a and the hollow shaft 17c are subject to a centrifugal force effect, which at least partially can be offset by the buoyant force of the lubricating oil and the design of the valve components in terms of form and material. It is important for the buoyant force that the moving parts of the valve 17, i.e., the hollow shaft 17c, the valve spindle 17a and the valve closure element 17b, are surrounded by oil, i.e. are arranged in floating form in the cooling oil. The electronics module 28, in particular the electric motor 27, receives its electrical energy and its signals for closing and opening the cooling valve 17 on an inductive basis. For this purpose, on the one hand, a primary coil (without a reference number) on the housing side and, on the other hand, a secondary coil 30 arranged in the electronics module 28 (see FIG. 3) are arranged. Additional details of the electronics module 28 are explained in connection with the description of FIG. 3.

Figure 2:
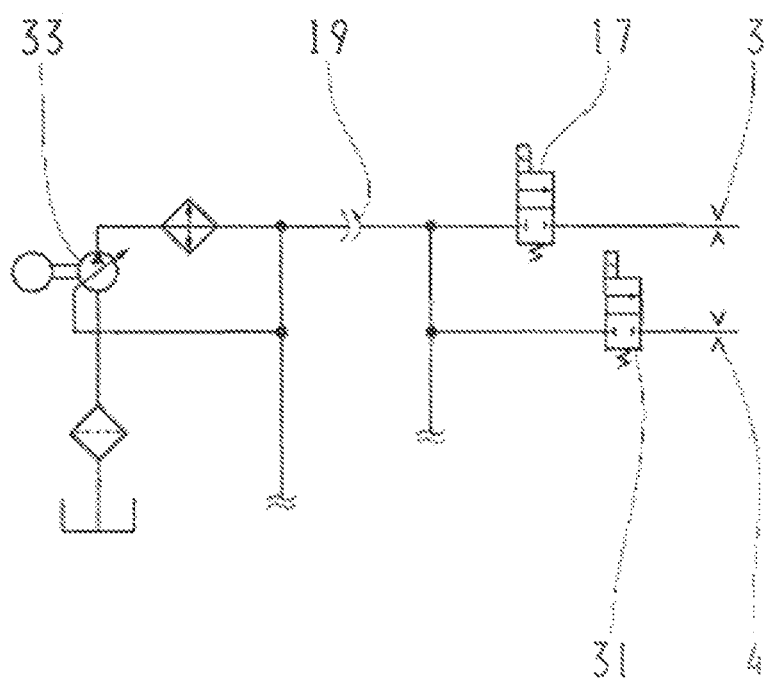

FIG. 2 shows a section from a lubricating oil circuit diagram for the two multi-disk shifting elements 3, 4, which are symbolically shown and correspond to the shifting elements 3, 4 in FIG. 1. The circuit diagram for the lubricating oil corresponds to the circuit diagram for the cooling oil, because the same oil is used for both lubrication and cooling. The lubricating and cooling oil is conveyed by a constant pressure pump 33 preferably powered by the internal combustion engine of the motor vehicle, and, with a nearly constant pressure level of approximately 1.5 bar, is delivered to the rotary oil exchanger 19 (see FIG. 1) on the gear shaft and thus to the cooling oil valve 17 along with a further cooling oil valve 31 connected in parallel. The constant pressure pump 33 is designed as a variable displacement pump, whereas the actual pressure is used for adjustment. Moreover, an electric pump, which provides the required oil pressure depending on various parameters, would be possible. Thus, the quantity of cooling oil of each shifting element 3, 4 is adjusted separately and independent of each other.

The cooling valves 17, 31 may be designed as shift valves (simple version) or as control valves, whereas the shift valve, preferably designed as a magnetic valve, only switches on and off, i.e. if an acute need for cooling arises, such as through overheating or severe warming. In the case of a control valve, the quantity of cooling oil—depending on the need for cooling—may also be adjusted. One method for cooling is that the switching on of the cooling, i.e. the opening of the cooling oil valves 17 and/or 31 is sought particularly when a loss of power is less disrupted or is low. This is the case, for example, if the transmission is in overrun mode (such as when driving downhill or when braking), if the gear part affected by the drag torque is in any event to be slowed down (for example, upon a power shifting) or if the affected shifting element is closed or rotated with a low differential speed. In addition, a need for cooling may exist if the clutch is opened under a severe warming, or there is a need for subsequent cooling. In order to minimize the drag torque through a cooling oil flow, the subsequent cooling is switched off again after the required time period.

Optionally, a temperature sensor (not shown in the drawing) can be arranged in the area of the cooling oil stream, which records the oil or component temperature and reports to the electronic control device 28 without contact. For example, the temperature sensor may be arranged directly on the shift elements 3, 4 and, in the case of overheating, may immediately bring about an increase in the flow of cooling oil.

Figure 3:
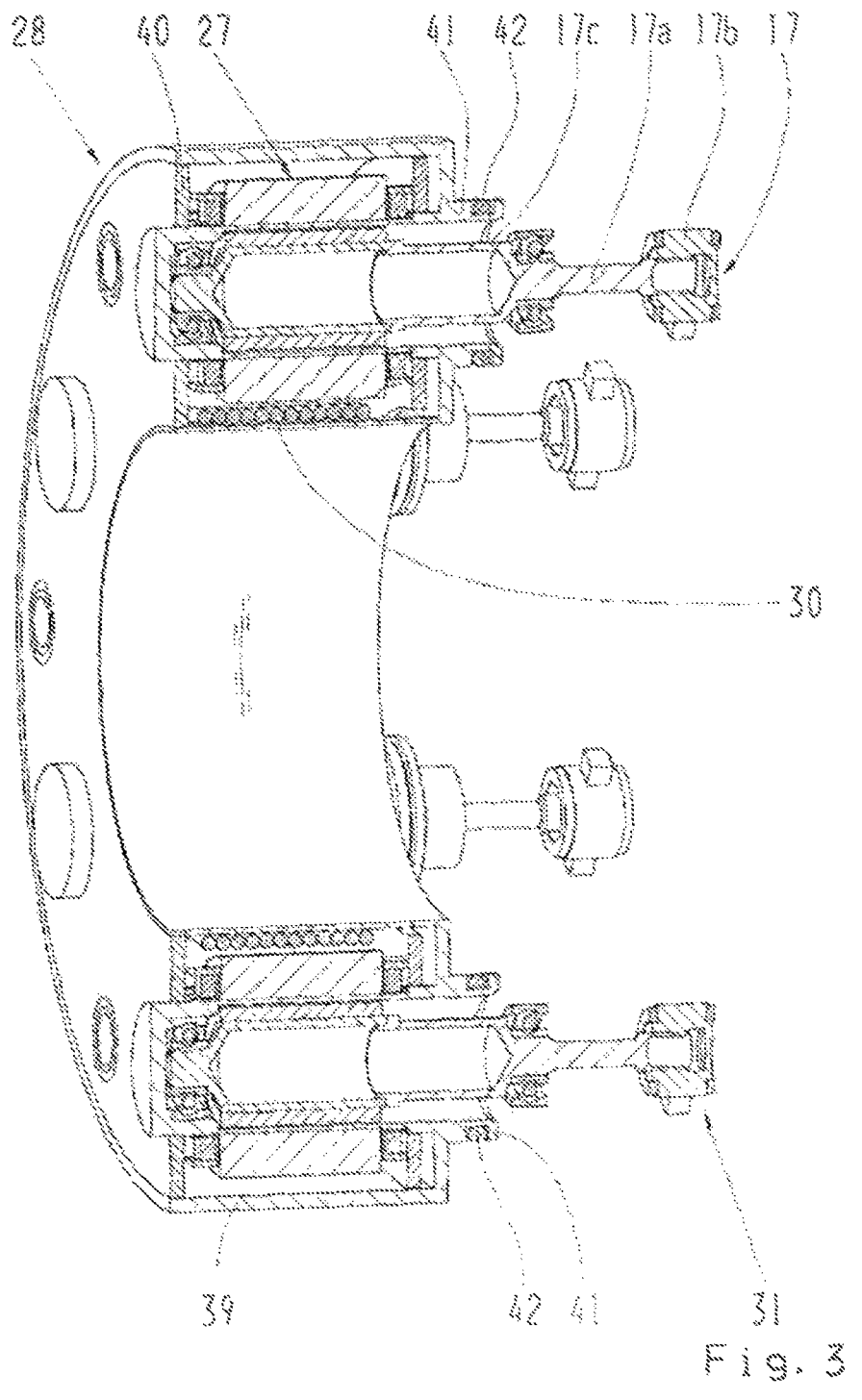

FIG. 3 shows the electronics module 28, also referred to as the electronic control device 28, as a separate structural unit in a perspective view, whereas two cooling oil valves, the cooling oil valve shown in FIG. 1 and an additional identical cooling oil valve 31 are shown in sections. The electronics module 28 features a housing 39 formed in a ring shape, which is sealed to the outside by a cover 40. The stator of the electric motor 27 is arranged inside the housing (as in FIG. 1, the same reference numbers are used for the same parts). On the housing 39, connection fittings 41 are molded, through which the electronics module 28 is connected to the body 2a of the functional mounting 2 (see FIG. 1). At the same time, a sealing of the housing 39 against the oil chamber in the body 2a of the functional mounting 2 is effected through O-rings 42. In the drawing, four valves, two with the reference numbers 17, 31, and two more without reference numbers, can be seen. As a whole, six valves could be arranged around the circumference of the electronics module 28, whereas the valves 17, 31 act as cooling oil valves—the remaining four valves, which are identically designed, can be used as shut-off valves in one hydraulic circuit, as described in the aforementioned simultaneous application of the applicant, U.S. Ser. No. 14/352,104. As mentioned above, the rotating spindle 17a and the hollow shaft 17c run into the oil chamber: on the one hand, they are subject to a centrifugal force effect and, on the other hand, they experience a buoyant force acting against the centrifugal force, which is determined by the weight of the quantity of the displaced oil. In order to increase the buoyant force, the armature shaft 17c is hollow. In addition, materials with low specific weight are preferably used, in order to minimize the centrifugal force effect. As can be seen from the drawing, the hollow shaft 17c is mounted twice. In place of the electric motor 27 for producing a rotating movement, a magnet may be used in connection with a valve tappet, depending on type of magnetic valve. The translational motion of the valve tappet is then directly transferred to the closure element. As mentioned above, the transmission of electrical energy is effected on an inductive basis: for this purpose, the secondary winding 30 is arranged within the electronics module 28 in the radial internal area, which is in operative connection with the primary winding not shown here (see FIG. 1).

Additional details regarding the structure and mode of operation of the electronics module 28 may be seen in the simultaneously submitted application of the applicant, U.S. Ser. No. 14/352,095, as mentioned above.

The invention claimed is:

1. A device for controlling oil flow for cooling or lubricating a location connected to a rotating shaft, comprising:
   a valve mounted in a torque-proof manner at the location on the rotating shaft so as to rotate with the rotating shaft, wherein flow of oil to cool or lubricate the location is through the valve, the valve being electrically controlled; and
   the valve connected in a non-contact manner to an electrical energy source such that the valve rotates with the shaft while being inductively, supplied with electrical energy for actuating the valve.

2. The device as in claim 1, wherein the valve is received in a functional mounting attached to the rotating shaft.

3. The device as in claim 2, wherein the functional mounting comprises oil flow channels that supply oil to the valve, the oil flow channels in communication with a shaft oil flow channel defined in the rotating shaft, and the shaft oil flow channel in communication with a rotary oil exchanger.

4. The device as in claim 3, further comprising at least one additional valve received in the functional mounting, the rotary oil exchanger supplying oil to the additional valve via the shaft oil flow channel and additional oil flow channels in the functional mounting.

5. The device as in claim 3, wherein the oil flow channels in the functional mounting comprise an outlet at a discharge side of the valve, the outlet disposed to supply oil from the valve to the location connected to the rotating shaft.

6. The device as in claim 5, wherein one of the oil flow channels in the functional mounting is disposed between the valve and the outlet and further comprises a manifold directed radially inward.

7. The device as in claim 1, wherein the valve is one of a shift valve movable between and open and closed position, or a variably positionable control valve.

8. The device as in claim 1, wherein the valve further comprises an armature shaft axially aligned with a valve spindle, the armature shaft driven in a non-contact manner by an electric motor to actuate the valve.

9. The device as in claim 1, wherein the valve is a magnetically actuated valve.

10. The device as in claim 1, further comprising an electronic control device fastened on the functional mounting.

11. The device as in claim 10, further comprising an actuator configured in the electronic control device, the valve operably connected to the actuator.

12. The device as in claim 11, wherein the electronic control device is a ring-shaped member disposed around the rotating shaft, and further comprising a plurality of the actuators and associated valves circumferentially spaced around the electronic control device.

13. The device as in claim 1, wherein the valve is received in a functional mounting attached to the rotating shaft, the valve comprising movable actuating components arranged in floating form in the oil within the functional mounting.

14. The device as in claim 13, wherein the movable actuating components of the valve have an average density of about the density of the oil in the functional mounting.

15. The device as in claim 1, further comprising a temperature sensor in the flow path of the oil to the location connected to the rotating shaft.

16. The device as in claim 1, further comprising a constant pressure pump arranged to supply oil to the valve.

17. The device as in claim 1, wherein the location connected to the rotating shaft is a multi-disk shifting element.

18. The device as in claim 17, wherein the device is configured with a motor vehicle transmission to supply cooling or lubricating coil oil to one or more of the multi-disk shifting elements in the transmission.

* * * * *